Patented Mar. 13, 1951

2,545,261

UNITED STATES PATENT OFFICE 2,545,261

CATALYSIS OF ADDITION REACTIONS

Robert M. Cole, Bryn Athyn, Pa., assignor to Chemical Elaborations, Inc., Philadelphia, Pa., a corporation of Delaware No Drawing. Application October 8, 1947, Serial No. 778,721

9 Claims. (Cl. 260—601)

This invention relates to addition reactions of organic compounds, and, more particularly, to condensation reactions of aldehydes.

It is known that addition products may be obtained, for example, by condensation of one aldehyde molecule on another, when the material is treated with an alkali catalyst. Dilute caustic or alkali acetates are the most frequently used catalysts.

However, the yields obtained with these catalysts have not been satisfactory, and it has been difficult to control the progress of the reaction.

For example, the classical method of producing $\alpha$-methyl-$\beta$-ethyl acrolein (2-me-pentene-2-al-1) is to heat propionaldehyde in admixture with a concentrated (47%) aqueous solution of sodium acetate. Propionaldehyde is only slightly soluble in such a solution, and as a result, the admixture consists substantially of an emulsion. Due to the poor contact between the aldehyde and the catalyst, the reaction is very slow. The yield of dimer is unsatisfactory.

In addition, the sodium acetate reaction is hazardous, since the emulsion has a tendency to break down, releasing propionaldehyde, which floats on top of the acetate solution. When this condition exists, the actate solution may be raised to a temperature considerably above the boiling point of the propionaldehyde, which, as a consequence, may be abruptly vaporized, with resulting damage to the apparatus and loss of material.

A general object of the present invention is to attain smooth control of addition reactions and particularly of aldol condensations.

A more specific object of the invention is to produce high yields of $\alpha$-methyl-$\beta$-ethyl acrolein from propionaldehyde conveniently and with accurate control of the reaction products.

I attain these objects by employing as a catalyst for the aldol condensation an aqueous solution of an alkali metal soap of a higher fatty acid.

According to the invention, the soap is used in aqueous solution whose concentration may vary according to the starting materials and also according to the end product desired. For example, when forming the unsaturated dimer of propionaldehyde, I prefer to use a concentration of between 10 and 30% soap. The starting material is dissolved in about an equal volume of the soap solution, and refluxed until the addition reaction has gone to completion as indicated by the leveling off of the boiling point of the material. Depending upon the material taken for treatment, this may require from 1 to 15 hours.

As is known, the saturated dimer of propionaldehyde (2-methyl-3-hydroxy-valeric-aldehyde) is dehydrated concurrently with its formation to $\alpha$-methyl-$\beta$-ethyl acrolein.

The new aldehyde is only slightly soluble in the soap solution, and will be observed to collect above the soap. The major portion of the reacted material may therefore be physically separated from the soap solution, and the balance steam distilled therefrom. Alternatively, the reacted material, still in the soap solution, may be transferred to a stainless steel still-kettle which is heated with steam until all of the volatile materials are distilled over. The distillate is then dried and fractionated. The soap solution remaining after the distillation may be recharged with solid soap and employed in the next run.

I have found that the sodium soaps are most satisfactory for the propionaldehyde condensation, and that, of these, sodium stearate (pH 9.45) is the most generally available and gives excellent results. As a matter of fact, I have found that the universally available hard white soap of commerce affords a cheap and convenient source of this material.

Whatever the source, the soap employed must be of reasonable purity, and, specifically, must contain no free alkali, since the high pH of free alkali apparently catalyzes the reaction of trimers and higher polymers, and, in fact, introduces many of the difficulties inherent in the prior art processes.

The concentration of soap in the soap solution depends to considerable extent upon the material being treated and the end product desired. The minimum concentration is ordinarily limited by the solubility of the starting material, that is, the soap solution must be strong enough to completely dissolve the starting materials. On the other hand, I have found that with very concentrated soap solutions the reaction may be too vigorous, or that the addition reaction will be extended to produce larger molecules than desired. Between these two extremes, which, of course, vary with different materials, there is an optimum concentration which affords excellent control of the progress of the reaction. It should perhaps be pointed out that within this range economic considerations may locate the concentration somewhat away from the point of optimum conversion. For example, when it is desired to take advantage of the fact that the soap is not affected by the reaction and may be used over again, it is preferable to operate at a relatively low concentration to avoid the formation of high molecular weight compounds, since the unreacted material may be recycled and ultimately converted to the desired end product.

The yields obtained depend upon the concentration of the soap solution, the ratio of soap solution to raw material, the particular soap used as a catalyst, and the temperature of the mixture. In accordance with the practice of the invention, I have obtained conversions per cycle varying from 50 to 85% of the theoretical amounts.

As an example of the invention, I will now describe a specific instance of the formation of the unsaturated dimer of propionaldehyde.

A 20% soap solution was prepared by dissolving 2000 grams of commercial hard white soap in 8000 grams of distilled water and heating until all of the soap had gone into solution, and then allowing the solution to cool.

5210 grams of propionaldehyde (approximately 90 moles) was mixed with an equal volume of the soap solution and agitated until a clear mixture was obtained. It should be emphasized at this point that it is highly important that the propionaldehyde-soap mixture be present in the form of a single clear phase. The solution was then placed in a stainless steel still-kettle fitted with an efficient reflux condenser. The temperature was gradually raised to the neighborhood of 60° C. at which temperature the mixture of soap and propionaldehyde started to boil.

As the reaction progressed, the boiling point was observed to rise over a period of about 8 hours, finally leveling off at about 90° C., at which time the heating was terminated. The material was transferred to a separatory funnel and the floating layer of reacted material removed. The balance of the soap solution was transferred to a distillation kettle of stainless steel and steam distilled to recover the dissolved material. The total product, after having been dried with anhydrous sodium sulfate, was distilled directly from a Claissen flask.

The distillate was divided into three fractions and a residue, which were then refractionated in accordance with orthodox technique to recover 3628 grams of material exhibiting a constant boiling point of 137.3° C. The theoretical conversion, calculated upon the basis of 5210 grams (the weight of the original material) less 810 grams (the weight of 45 moles of water lost in the dehydration of the saturated dimer), equals 4400 grams. The conversion actually realized, namely, 3628 grams, therefore, represented 82.4% of the theoretical conversion.

It should be pointed out that the low boiling fractions obtained during the distillation are recycled in the practice of the invention, and that, accordingly, the overall yield of a continuous process will be higher than the conversion effected in a single reaction. It should also be mentioned that the apparatus used has a pronounced effect upon yield; for example, when employing glass apparatus with conventional sealed joints, the loss of material due to the volatility of propionaldehyde reduced the conversion per cycle to figures in the neighborhood of 50% of the theoretical conversion.

The remaining soap solution was preserved, and upon being reinforced with solid soap to restore the concentration to 20%, was available for use with a new charge of propionaldehyde.

I have observed that when the concentration of soap is increased beyond 30%, the conditions were found to favor the formation of trimers. On the other hand, when the concentration of soap is reduced below 10%, the propionaldehyde does not completely dissolve.

It should be pointed out that the raw material taken for treatment, for instance, the propionaldehyde described in the example reported above, should be of reasonable purity and should be acid free to avoid releasing the fatty acid from the soap.

Among the advantages of the invention may be mentioned the following:

The alkali metal and the fatty acid comprising the soap may be selected to give the precise pH most suitable for the production of a particular condensation product. For example, when a higher pH is desired, potassium soaps may be employed, or weaker acids, such as myristic acid, may be used in forming the soap. On the other hand, when a lower pH is desirable, the sodium soaps of stronger acids, such as oleic acid, may be used. Thus, according to the invention, a large part of the reacting material may be obtained in the form of a compound of a given molecular weight.

The soap employed as a catalyst in the present invention is an excellent solvent for the raw materials, with the result that the reaction time is drastically reduced.

The excellent solvent characteristics of the soap solution also eliminate the hazard of superheating of the liquid reactants during refluxing. The solvent action of the soap is selective to the extent that the condensation product is readily separable from the soap solution.

According to the invention, therefore, it is possible to effect the reaction smoothly and to convert a substantial portion of the raw material to the desired end product.

It should be stated in conclusion that the high degree of control inherent in the invention is especially adapted to the formation of dimolecular aldehydes.

I claim:

1. The method of preparing α-methyl-β-ethyl acrolein which comprises dissolving propionaldehyde in about an equal volume of a 10 to 30% aqueous solution of sodium stearate, refluxing until the boiling point of the mixture reaches 90° C., and fractionally distilling the mixture to obtain a product having a constant boiling point at 137.3° C.

2. The process of preparing α-methyl-β-ethyl acrolein which comprises heating propionaldehyde in admixture with an equal volume of an aqueous solution comprising 10 to 30% sodium stearate by weight.

3. The method of producing α-methyl-β-ethyl acrolein from propionaldehyde which comprises refluxing a mixture of propionaldehyde and an aqueous solution of sodium stearate for a length of time sufficient to raise the vapor temperature to about 90° C.

4. The process which comprises dissolving propionaldehyde in a 20% aqueous solution of sodium stearate, refluxing until the boiling point of the solution reaches about 90° C. and isolating α-methyl-β-ethyl acrolein.

5. The method of producing α-methyl-β-ethyl acrolein which comprises refluxing a mixture of propionaldehyde and an aqueous solution comprising from 10 to 30% of a commercial hard white soap for a length of time sufficient to raise the vapor temperature to about 90° C.

6. The method of producing α-methyl-β-ethyl acrolein from propionaldehyde which comprises heating a mixture of propionaldehyde and an aqueous solution of sodium stearate of from 10 to 30% concentration by weight at a temperature in excess of 60° C. for from 1 to 10 hours.

7. The method of producing dimeric aldehydes which comprises refluxing a volume of a monomeric aldehyde dissolved in about an equal volume of an aqueous solution of an alkali metal soap of a higher fatty acid, terminating the reaction after a portion of the monomer is condensed to the dimer, isolating said dimer from the mixture of monomer and soap, reenforcing said mixture with additional monomer and soap, and repeating the operation.

8. The method which comprises refluxing a mixture of propionaldehyde and about an equal volume of a 10 to 20% aqueous solution of sodium stearate at a temperature between 60° C. and 90° C. until a portion of the propionaldehyde is condensed to methyl ethyl acrolein, isolating said methyl ethyl acrolein, charging the remainder of said mixture with fresh propionaldehyde and sodium stearate, and recycling said mixture.

9. The method of producing α-methyl-β-ethyl acrolein which comprises the steps of refluxing a volume of propionaldehyde dissolved in about an equal volume of an aqueous solution of an alkali metal soap of a higher fatty acid, terminating the reaction after a portion of the propionaldehyde is condensed to α-methyl-β-ethyl acrolein, isolating the so-formed α-methyl-β-ethyl acrolein from the mixture of propionaldehyde and soap, reenforcing said mixture with additional propionaldehyde and soap to restore the mixture to its original composition, and repeating the operation.

ROBERT M. COLE.

REFERENCES CITED

The following references are of record in the file of this patent:

UNITED STATES PATENTS

| Number | Name | Date |
|---|---|---|
| 2,230,591 | Fischer et al. | Feb. 4, 1941 |

OTHER REFERENCES

Lieben et al., "Monatschefte f. Chemie," vol. 4, pages 16 to 21 (1883).